United States Patent [19]
Beuselinck

[11] 3,896,029
[45] July 22, 1975

[54] SWITCHING VALVE FOR CONTINUOUS FILTERING DEVICES

[75] Inventor: Marcel Leon Beuselinck, Wommelgem, Belgium

[73] Assignee: Agfa-Gevaert Aktiengesellschaft, Mortsel, Belgium

[22] Filed: Feb. 15, 1974

[21] Appl. No.: 443,100

[30] Foreign Application Priority Data
Feb. 16, 1973 United Kingdom............... 7839/73

[52] U.S. Cl. ...... 210/341; 137/625.19; 137/625.32; 210/DIG. 15; 210/347
[51] Int. Cl............................................. B01d 29/36
[58] Field of Search..... 137/625.19, 625.23, 625.30, 137/625.32, 625.39, 627.5; 210/341, 347, DIG. 15

[56] References Cited
UNITED STATES PATENTS

| | | | |
|---|---|---|---|
| 1,068,743 | 7/1913 | Dahl | 210/341 X |
| 2,921,687 | 1/1960 | Jenkins | 210/341 |
| 3,048,191 | 8/1962 | Crang | 137/625.32 |
| 3,108,614 | 10/1963 | Narara | 137/625.19 X |
| 3,116,755 | 1/1964 | McNeal | 210/341 X |
| 3,224,462 | 12/1965 | Lopker | 137/625.19 |
| 3,243,849 | 4/1966 | Joukainen | 210/347 X |
| 3,394,735 | 7/1968 | Wurster | 137/625.32 |
| 3,443,591 | 5/1969 | Blanzy et al. | 137/625.3 |
| 3,459,228 | 8/1969 | Mongodm et al. | 137/625.32 X |
| 3,499,467 | 3/1970 | McCord et al. | 137/625.19 |

Primary Examiner—Theodore A. Granger
Attorney, Agent, or Firm—William J. Daniel

[57] ABSTRACT

A valve is presented which enables progressively switching from a first fiber screen pack to another without interrupting the continuous flow of filtrate at the exit of the filter installation. A characteristic feature of the invention is that no countercurrent flow in the conduits is built-up, so that the pressure in the installation is kept within reasonable limits. The structure of the valve also permits an easy air-draining of the filter to be inserted in the conduit. The conical form of the valve member guarantees leak-proof operation, notwithstanding high temperature and pressure which may be present in the installation.

5 Claims, 6 Drawing Figures

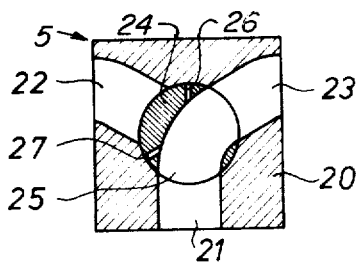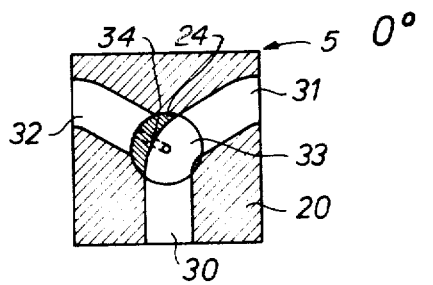
0°
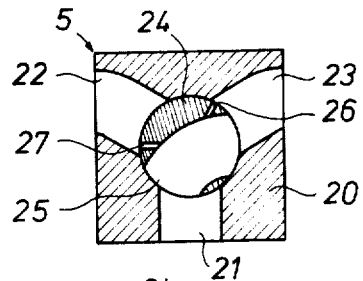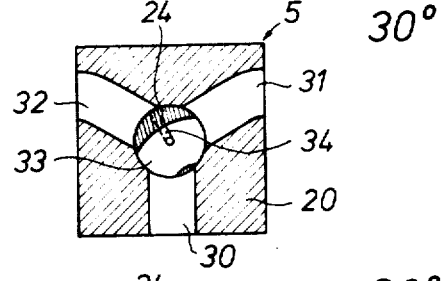
30°
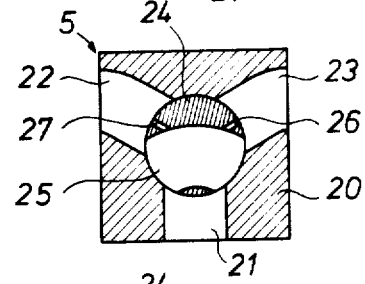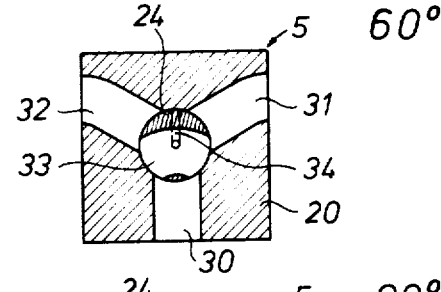
60°
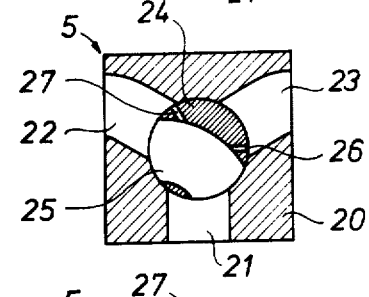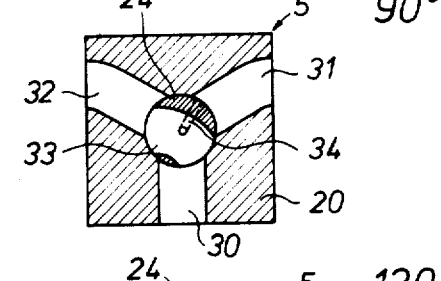
90°
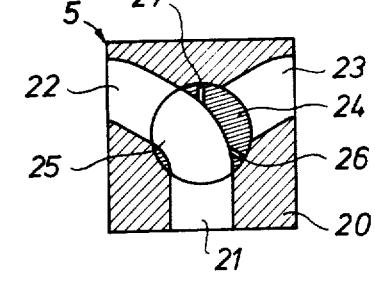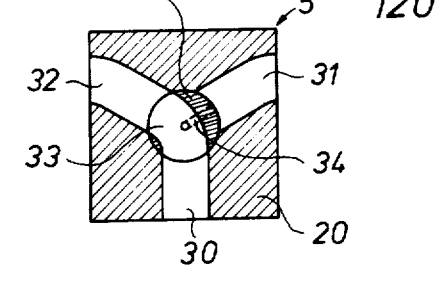
120°
*Fig. 5a*   *Fig. 5b*

SWITCHING VALVE FOR CONTINUOUS FILTERING DEVICES

This invention is related to a fluid flow control unit suitable for use in switching the flow of polymer melt from one filtering device to another without interruption of the polymer melt flow.

During extrusion, chips or scrap of a polyester are fed into an extrusion device which generally consists of a heated longitudinally extending body, bearing at its innerside means to forward a melt of said chips or scrap in a uniform way towards an outlet where generally the melt is forced through a die, which is an opening of well defined cross-section, whereinafter the melt is cooled abruptly. When extremely high quality criteria are imposed to the finished product, for example when said product is destined to serve as a support for photographic film, the rudimentary apparatus as described above no longer suffices.

Indeed, the base product itself generally contains a slight amount of impurities (as for example industrial dust) which, when left in the finished product, would decrease the quality of the latter in such a way that a photographic film made from such web and provided with an emulsion layer, would show inadmissible quality deficiencies after processing. The need for high quality filtering in thus essential, and generally one or more filtering devices are provided at most extrusion installations.

The filtering device has to retain the impurities which may be present in the base product. Generally, a series of filter screens of diminishing mesh-sizes are provided which are housed in an appropriate filter screen carrier capable of resisting the high pressure and temperature at which the melt is forwarded through the extruder.

Dependent from the initial quality of the base material, the filter screen becomes clogged after a more or less long period. As clogging of a filter screen greatly reduces the extruder's output, changing is necessary once the yield of the installation has reached a value judged to be not economical anymore. As changing of a filter screen pack even for a skilled worker, requires a relatively long time during which the extruder is off-line, a considerable amount of the production gets lost. Moreover, still another relatively long period is required to re-start the extruder, as the whole screen carrier has to be brought gradually to the normal conditions of temperature and pressure at which an extrusion line operates. In order to keep these off-line periods within reasonable limits, generally use is made of two filter screen carriers which may work either in turn or simultaneously. In the first case, when insertion of a new filter screen pack becomes necessary, one leads the flow of polymer melt to the carrier which is previously brought in stand-by position and which houses a clean filter screen pack and may keep the extruder operating while one disposes of sufficient time for replacing the clogged filter screen pack by a clean one. In the second case, which is more or less analogous, one filter screen pack has temporarily to filter all of the mass of polymer delivered by the extruder; so that one must try to limit the off-time period as the pressure within the filter screen carrier may rise considerably during replacement of the clogged filter battery.

Both aforementioned methods have in common that a switching action must occur at a given moment and that this switching action must be as gradual and continuous as possible. Indeed, the sudden cut-off of the polymer flow in the clogged filter screen carrier and the introduction of the said flow in the other would give rise to unwanted side-effects, among which the inclusion of air-bubbles in the polymer melt is one of the most important.

In this case, the presence of bubbles not only would result in a product of inferior quality but would also be the cause of mechanical defects during further production stages, such as rupturing of the finished web during stretching due to local weakness of the web, for example.

Many switch valve units have been devised, going from multiple valve-stations to mono-valve systems which all in a more or less convenient way attempted to solve the problem. Mono-valve systems which act continuously and gradually are preferred due to their relative simplicity, their ease of operation and the fact that switching may occur at only one and sole place of the whole extrusion line. Such a valve is described in U.S. Pat. No. 3,245,849 of K. Klager Richard, D. Geckler and Richard L. Parret issued Apr. 12, 1966. Although good results as to reliability may be obtained, such monovalve still presents some inconveniences which may be the cause of a temporary lack of quality of the filtered product and/or an unnecessary wasting of the latter.

Indeed, draining of air from the inserted filter screen carrier occurs in counter-current direction which means that already filtered polymer melt is used for this purpose. At least a small amount of the melt gets lost in this way. Moreover, counter-current draining requires a higher pressure, so that a supplementary power must be delivered to the extruder screw.

A third inconvenience of counter-current draining is the fact that during this process unwanted idle corners or stagnant zones may be created, causing a degradation of the polymer melt at those areas.

Another type of switching device, which enables a gradual switching over from one filter screen carrier to another, is disclosed in British Patent Specification 1,215,381 filed Jan. 30, 1968 by C. G. Deringer & Co. This specification relates to a movable filter screen carrier, capable of performing a relative motion around a central dispensing body. The central dispensing body has a first opening through which molten polymer is forwarded to the inlet opening of a first filter screen pack. After filtering, the filtered polymer is introduced into a second opening in the central dispensing body which remains immobile. A second filter screen pack, also housed in the movable filter screen carrier is kept in stand-by position in order to be put on-line, once the first filter screen pack becomes clogged by impurities contained in the molten polymer. Switching from the first to the second filter screen pack occurs by imparting a stepwise motion to the movable screen carrier in order to permit the air draining of the clean filter screen pack, filling it with polymer and taking it on-line, and the gradual taking off-line of the clogged filter screen pack.

Whereas such device may suit very well in the case that a relatively low pressure prevails in the process-line, its reliability becomes questionable once pressures in the range of 180 to 200 kg/cm$^2$, as it is the case when extruding polyethylene terephthalate, are common.

Indeed, the forces exerted on the cylindrical body due to the essentially asymmetric charge of the screen carrier, together with the presence of thin bushings of relatively weak metals or alloys thereof in order to prevent leakage would become excessive in the case of a high-capacity polyester line. Moreover a powerful airmotor or other kind of mechanism capable of moving the screen carrier must be provided, requiring the installation of a supplementary power supply. The system requires appreciable space in which to operate due to the arrangement of the screen carrier for movement around the central dispenser.

The subject of the present invention is a fluid flow control unit which permits flow of a molten plastics or other fluid material supplied to the unit to be readily switched in a progressive manner from one delivery line to another.

While the invention has been made primarily for use in switching the flow of molten plastics from one to the other of different filter packs installed in parallel in a flow line, a control unit according to the invention can be used for fluid flow control on other kinds of system.

The invention provides a fluid flow control unit comprising a casing defining a valve chamber and having an inlet port and alternative outlet ports, angularly spaced about an axis of such chamber, in a first section of such casing and having alternative inlet ports and an outlet port, angularly spaced about such axis, in a second section of such casing, such inlet and outlet ports in each of said first and second sections extending from the exterior of the casing to said chamber; and a valve member which is rotatable within said valve chamber about said axis, and is formed with a first flow channel for placing the inlet port in said first section of the casing into communication with one or the other of said outlet ports in that section (depending on the position of such valve member about said axis), said first flow channel being provided with at least two fluid flow branch channels orientated so that during turning movement of the valve member to close one first section outlet port, one of such branch channels functions to prevent the formation of a stagnant zone at the outlet side of the valve member while the other of such branch channels places the other first section outlet port into communication with the first section inlet port before those ports commence to be connected by said first flow channel, and with a second flow channel for placing the outlet port in the said second section of said casing into communication with one or the other of the inlet ports in that second section (depending on the position of such valve member about said axis), said second flow channel being provided with at least one drain channel which connects a said first section outlet port to atmosphere when the valve member is located so as to block communication between that outlet port and the first section inlet port; the cross-sectional dimensions and disposition of said flow channels in said valve member in relation to the size of said inlet and outlet ports and their disposition around the said chamber being such that when the first section inlet port is in communication with either of the first section outlet ports, one of the second section inlet ports is in communication with the second section outlet port, and such that when the valve member is turned about its axis to cause progressive closure of communication between the first section inlet port and one of the first section outlet ports and simultaneous progressive closure of communication between one of the second section inlet ports and the second section outlet port, such progressive closures are accompanied by a progressive opening of communication between the first section inlet port and the other of the first section outlet ports and by a progressive opening of communication between the other of the second section inlet ports and the second section outlet port.

In the preferred embodiments, the valve member and the chamber in which it is accommodated are of generally conical form. In that case the required sealing contact between te said valve member and the surrounding wall of the valve chamber can be more easily maintained when such surfaces have suffered wear.

The flow channels in the valve member may be bores extending through the valve member from one part of its periphery to another. Alternatively such flow channels may be provided by peripheral grooves in the valve member the open tops of such grooves being closed by the chamber wall surrounding the valve member.

The invention includes a filtering installation comprising two filtration devices each having an inlet connected to one of the first section outlet ports of a said fluid flow control unit and an outlet connected to one of the second section inlet ports of such unit, the first section inlet port and the second section outlet port of such unit being respectively connected to an input line for fluid medium to be filtered and an outlet line for filtered medium.

The invention includes any valve unit for changing a filter screen pack in a liquid conduit, comprising:

a valve body having an inlet section and an outlet section, said inlet section comprising a valve inlet port through which liquid is introduced into said valve unit and two valve outlet ports, one of said outlet ports being in communicating relationship with the inlet of a first filter screen carrier which is in use, while the other is in communicating relationship with the inlet of a second filter screen carrier which is off-line, but in stand-by position, said outlet section comprising two valve inlet ports, one of them being in communication with the outlet of said first filter screen carrier, while the other is connected to the outlet of said second filter screen carrier, and a valve outlet port through which the liquid is reintroduced into said conduit after filtering;

a conical valve member, rotatably journalled in said valve body, said valve member being provided with an (preferably radially oriented) inlet channel connecting the valve inlet port in said inlet section with that one of said valve outlet ports which communicates with the inlet of said first filter screen carrier, and being also provided with an (preferably radially oriented) outlet channel connecting the valve outlet port in said outlet section with that one of the said valve inlet ports which communicates with the outlet of said first filter screen pack;

two cooperating vent passages in said inlet channel which are respectively in the direct line of the axis of the valve inlet port and of the axis of the valve outlet port communicating with said first filter screen carrier;

a vent passage for connecting to atmosphere that inlet port in said valve outlet section which communicates with the outlet of said second filter screen carrier; and means whereby the valve member can be given successive turning movements in said valve body.

The scope and spirit of the invention will hereinafter be exemplified in the light of a preferred embodiment and with reference to the accompanying drawings in which.

FIGS. 5a and b are views of a horizontal section through the valve at the height of the inlet section, respectively at the height of the outlet section in order to illustrate the different necessary steps for switching from one filter screen carrier to the other.

Figure 1:
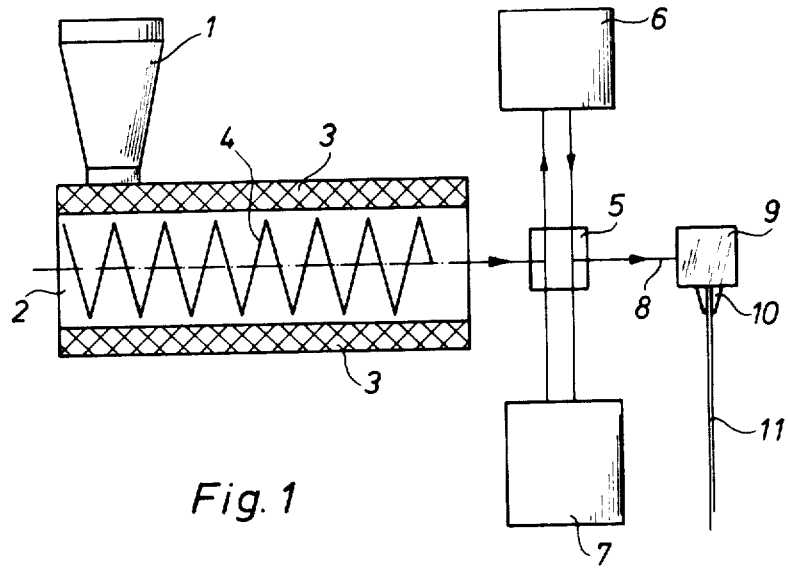
FIG. 1 represents a diagram of an extrusion installation embodying the invention.

The installation of FIG. 1 represents an extrusion line for manufacturing objects, for example a web 11 is thermoplastic material of given sectional form and dimensions. It comprises a hopper 1 into which chips, grains or scrap of a given polymer are temporarily stocked in order to be forwarded subsequently towards an extruder 2, which is heated to a temperature exceeding the melting temperature of the said polymer by means of heating means 3, the latter being either electrical heating coils or concentrically arranged mantles through which heated liquid flows. In the extruder 2, is provided a screw 4, which upon rotation conveys the gradually melting polymer to a valve 5 which guides the flow of polymer melt to a filter screen carrier 6, the outlet of which is connected to a conduit 8, via the same switching valve 5. The screw 4 is rotationally driven by motor means (not shown). The conduit 8 is connected with the extrusion die 9 provided with a slit 10 of given sectional dimensions through which the melt is forced in order to produce e.g. web 11. The description of the other parts of the installation and the further treatment of the web are not represented since they are not essential for the understanding of the invention.

Further in FIG. 1, a second filter screen carrier 7 is provided, which is not in use. It is put on-line at the moment that the filter screen pack in the filter screen 6 becomes clogged as a consequence of the accumulation of impurities which are contained in the base material. Then, the valve 5 is gradually and continuously manipulated causing a gradual decrease of the flow of polymer melt through said filter screen carrier 6 and a gradual increase of said flow through the filter screen carrier 7, which houses a clean filter screen pack. The final situation of the system consisting of valve 5 and both filter screen carriers 6 and 7 will be that the flow through filter screen carrier 6 is arrested, and that said flow fully passes through filter screen carrier 7. It will be appreciated that this state may be reversed, once the filter screen pack in filter screen carrier 7 becomes clogged too. When the total output of the extruder 2 flows through filter screen carrier 7, filter screen carrier 6 may be provided with a new filter screen pack. It will be appreciated that due to the structure of the valve, which will be described in detail hereinafter this procedure may be carried out in a continuous way and without stopping the machine, and that one disposes of ample time in order to replace or to clean the clogged filter screen pack of the filter screen carrier which has been taken offline.

Figures 2, 3:
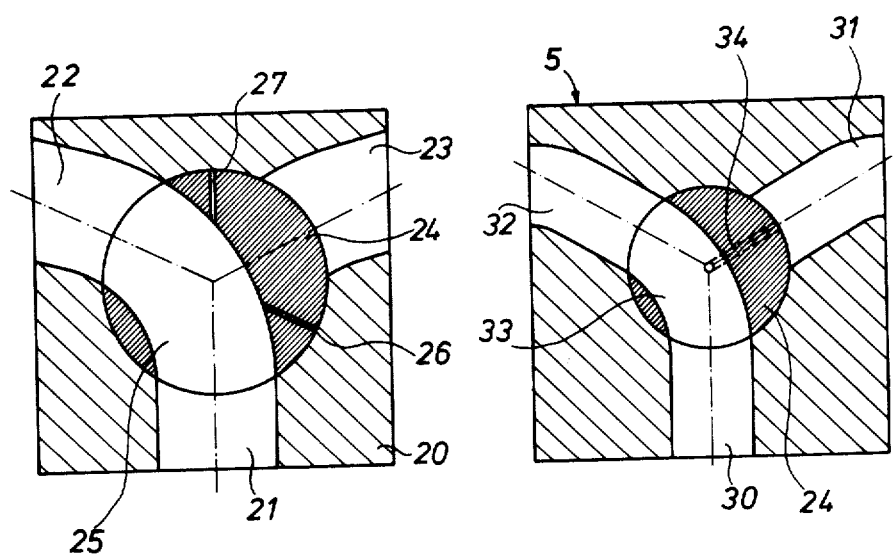
FIG. 2 is a sectional view of the valve according to the invention on line 2—2' in FIG. 4.
FIG. 3 is a sectional view through the valve on line 3—3' in FIG. 4.

In FIG. 2, there is shown a horizontally sectional view through the inlet section of the valve 5. The body 20 of said valve is here represented as having a square section but it will be understood that any shape, capable of enabling a leak-tight and firm contact between the valve body and the conduits connecting it to the filter screen packs may be applied. For clearness' sake it has been supposed that only two filter batteries are used in combination with an extruder. The valve according to the invention may however be adapted to be used in combination with a higher number of filters. This latter possibility depends only on the choice of the angle over which the valve member has to be rotated in order to perform a switching cycle. When this angle is chosen smaller, three, or even more filter screen packs may be connected to it.

In the center of the valve body 20, there is provided a conical valve member 24 in which an inlet channel 25 is provided. In the position as represented here said channel 25 communicates with the valve inlet port 21 and the valve outlet port 22, whereas valve outlet port 23 is connected with the conduit leading to the filter screen carrier which is offline. Hot polymer melt is forced through valve inlet port 21 and is thus conveyed towards the filter screen carrier connected to valve outlet port 22. At the level of the inlet section of member 24 and communicating with the valve member inlet channel 25 are provided two vent passages 26 and 27, shifted over 120° versus each other. The function of these vent passages will be explained further. The angle of conicity at which valve member 24 is executed preferably amounts to 20°, although every angle permitting ease of operating and guaranteeing leak-proof surfaces may be applied. The advantage of using a conical valve member resides in the fact that always a very intimate contact between the contacting surfaces of the member and the surrounding valve body 20 is obtained, so that problems as for example loss of contact due to wear, as might occur if a cylindrical member were used, are avoided so that creeping of molten polymer from the inlet section to the outlet section and vice versa becomes impossible.

The situation in the outlet section of the switching valve is illustrated in FIG. 3. Filtered polymer melt re-enters valve 5 at the valve inlet port 32 of the outlet section. Said inlet port 32 is in communicating relationship with the outlet of the filter screen carrier on-line (not shown), so that the polymer may be fed to the valve outlet port 30 via the outlet channel 33 in the valve member.

A passage 34 situated at 120° from the outlet port 30 and being in contact with the atmosphere through the bottom of the member 24 serves as drain port when switching from one filter screen carrier to another occurs. The function of said drain port will be explained in the course of this specification.

The remarks set forth for the input section presented in FIG. 2 may be repeated for this section of the valve, because exception made for the smaller diameter of the parts of the outlet section and the position of passage 34, both assemblies are practically identical and form one sole unit.

Figure 4:
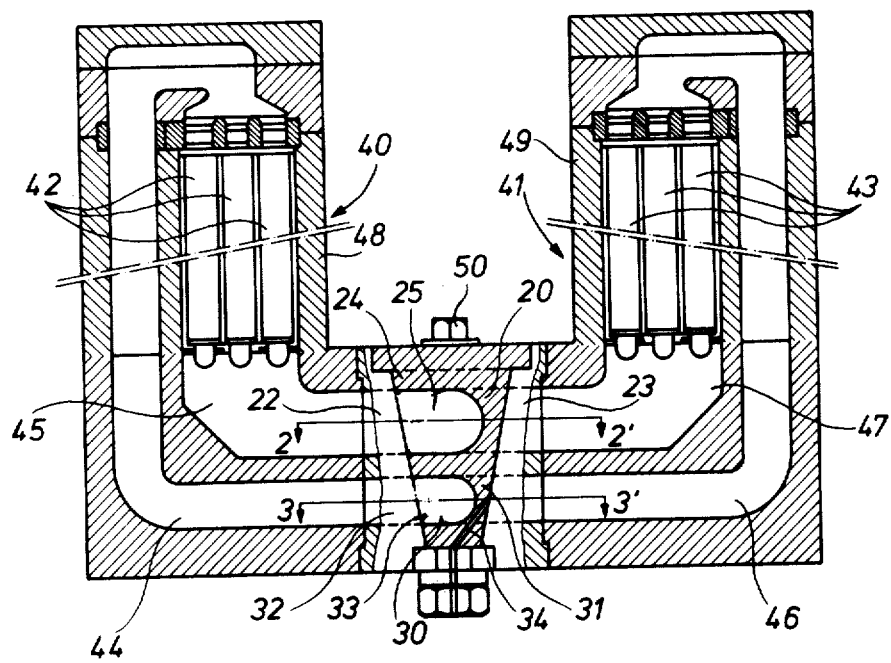
FIG. 4 is a sectional view of the filter screen carriers in combination with a preferred embodiment of a valve according to the invention.

A sectional view through the filtration unit is represented in FIG. 4. The valve 5 is located between filter screen carriers 40 and 41. For clearness' sake both filter screen carriers 40 and 41 are lengthwise reduced. Filter screen carrier 40 consists of a housing 48 in which a plurality of filter screen packs 42 are provided. Filter screen carrier 41 is composed of a housing 49 and the filter screen packs 43. In this example, filter screen packs of cylindrical section are provided, although the form and dimensions of the latter may be modified and adapted at will, provided that a filtering screen of sufficiently large surface in function of the extruder flow is provided.

In the position shown it is considered that, by turning the knob 50 manually or by other adequate means, the valve member 24 is turned into the position in which the filter screen carrier 40 is put on-line. So, hot polymer melt is forced to valve inlet port 21 and is guided to channel 45, the outlet of which is connected to the filter screen carrier 40. The molten polymer enters into the innerside of the filter screen packs 42 by passing through the filter screens (not shown) which are located around the mantle of each filter screen pack 42. The output flow of the whole filter screen carrier is collected at the outlet opening of each filter screen pack 42 and is forwarded to the valve 5 again through conduit 44, and it leaves said valve through outlet channel 30 towards a further manufacturing stage, which may be the proper extrusion step (not represented). It will be appreciated that the auxiliary devices such as heating elements, pressure meters, etc., as not being part of the invention have not been represented.

It may be derived from this figure, that the filtering circuit may be completed by measuring and sensing devices so as for example pressure measuring instruments by means of which the degree of clogging of the respective filter screen packs may be determined.

When this degree of clogging reaches a predetermined value, the situation is reversed and upon turning knob 50 over 120° as will be illustrated in FIG. 5a and b filter screen carrier 41 is put on-line.

FIGS. 5a and 5b represent horizontal sections through the inlet section, respectively through the outlet section of valve 5 in steps of 30° of rotation of valve member 24, that is to say, the sequences necessary for switching from one filter screen carrier to the other which require turning the valve member through 120°.

In the position denoted as zero degrees, the right hand filter screen pack is in use and is supplied with polyester melt through valve inlet port 21, the valve member inlet channel 25 and valve outlet port 23. After passing through the filter screen pack (not shown), filtered polymer re-enters valve 5 through valve inlet port 31, passes through valve member outlet channel 33 and leaves the valve 5 through valve outlet port 30.

At the position corresponding with a rotation of 30 degrees of member 24, switching from one filter screen carrier to the other begins. At this moment the main flow still moves as described hereinbefore, but in the meantime, two separate, very small flows are being built-up in the inlet section of the valve. One of such flows takes place through the passage 26 in order to avoid the creation of a stagnant zone in that position of valve outlet port 23 where it would otherwise be partially masked by the valve member 24. The other of such flows takes place through passage 27, communicating with valve outlet port 22, and starts filling the clean filter screen pack. During the return rotary movement of the valve member which is effected when it is desired to cause the flow of medium to be filtered through the outlet port 23 and to close the outlet port 22, the passage 27 functions to prevent the occurrence of a stagnant zone in outlet port 22 during such closure thereof.

Simultaneously, in the outlet section the flow of filtered polymer still re-enters valve 5 through valve inlet port 31 but the small flow through the filter battery being switched, causes air contained in said battery to leave the latter through the drain passage 34 which communicates with the outer atmosphere. In the embodiment shown, the outlet of passage 34 coincides with the axis of rotation of valve member 24. This draining of the enclosed air lasts until the whole filter screen pack and the conduits leading to and from it are filled with polymer. At that moment, molten polymer is projected through drain passage 34. It is clear that this step takes the major part of the time required for performing the whole switching sequence. The valve member 24 is then again turned over 30°, causing a fifty-fifty distribution of the polymer flow through the valve outlet ports 22 and 23 of the inlet section of valve 5 on the one hand and through the valve inlet ports 31 and 32 of the outlet section on the other hand. No more polymer is driven out of drain hole 34 because the latter is masked again by the walls of the valve body 20. The small flow through the passages 26 and 27 prevents the formation of stagnant zones and idle corners within the valve 5.

At the 90° position, the main flow of polymer is guided through the left-hand filter screen carrier, whereas draining of the right-hand filter occurs via passage 34 when still a very small flow of polymer is conveyed through the latter and through passage 26.

At the position corresponding with a 120° rotation of valve member 24, the situation at the beginning is completely reversed and the flow of molten polymer takes place entirely through the left-hand filter screen pack, whereas the right-hand one is completely shut off. In this position, the pressure within the right hand filter is practically kept at atmospheric pressure, as still always the connection between it and the drain hole 34 exists. This makes it relatively easy to remove said filter for cleaning, and also no danger for projecting hot polymer melt towards the service personal exists.

From the foregoing one may conclude that the valve according to the invention may be used for switching from one filter screen carrier to another, for temporarily taking off-line a filter screen pack, and for causing flow to take place through both filter packs in a fifty-fifty distribution. It is clear that in the latter case the position indicated as the 60° position corresponds with the normal working condition.

It will be appreciated by those skilled in the art, that the use of the valve hereinbefore described is not limited to its application in polymer extrusion technology only, but that it may serve for every process where continuous filtering without stopping the process is a necessity.

The valve may be used for switching from one filter battery to another when the batteries are situated between a melting and a pumping extruder just as well as when such filter batteries are between a pumping extruder and the die itself.

The valve may be operated mechanically or by hand and may be provided with supplementary devices such as pressure and flow indicators and position indicators in combination with blocking mechanisms, without departing from the scope and spirit of the invention, which will be derived from the appended claims.

We claim:

1. A flow control unit for selectively controlling fluid flow from a common inlet conduit through two loop-shaped flow paths into a common outlet conduit comprising a valve housing having at one section thereof a supply inlet port connected to said common inlet conduit and two loop inlet ports arranged in generally regularly angularly spaced relation about the axis of said housing, said loop inlet ports having substantially equal cross-sectional areas, and a valve member rotatable within said housing about said axis, said member having at one section thereof a main feed passage extending therethrough for continuous communication with said common inlet conduit and defining between said passage ends a wall section larger in angular extent that either of said loop inlet ports whereby upon rotation of said valve members either of said ports can be exclusively in communication with said feed passage and the other closed by said wall section or both said ports partially in communication therewith, and said valve member also having two substantially symmetrically arranged bleed passages extending from said feed passage through said wall section at loci spaced respectively from the corresponding ends of said wall section periphery and of said feed passage and from each other to maintain flow continuity during rotation of said valve member; said valve housing having at a second axially spaced section a supply discharge port connected to said outlet conduit and two loop discharge ports arranged in generally regularly spaced relation about the axis of said housing, said loop outlet ports having substantially equal cross-sectional areas, said valve member having at a second section thereof a discharge passage extending therethrough for establishing upon rotation of said valve member intercommunication between said supply discharge port and said loop discharge ports alternatively or both said loop discharge ports partially in correspondence with said inlet ports, and said valve member also having a vent passage extending from a locus on the valve member periphery generally intermediate the ends of said discharge passage to the outside atmosphere for venting the loop discharge port not is communication with said supply discharge port.

2. The control unit of claim 1 wherein said inlet ports in said housing are separated by housing wall sections mating with the valve member periphery and effective to close the ends of said two bleed passages at said valve member wall section when either of said loop inlet ports is exclusively in communication with said main feed passage in said valve member.

3. The control unit of claim 1 wherein said main feed passage extends generally arcuately through said valve member and defines an included wall section opposite said first wall section and smaller in angular extent than said supply inlet port.

4. The control unit of claim 1 wherein said valve member is generally conical in shape.

5. The control unit of claim 1 wherein each of said loop-shaped flow paths include a filtration unit.

* * * * *

UNITED STATES PATENT OFFICE
CERTIFICATE OF CORRECTION

PATENT NO. : 3,896,029
DATED : July 22, 1975
INVENTOR(S) : Marcel Leon Beuselinck It is certified that error appears in the above-identified patent and that said Letters Patent are hereby corrected as shown below:

In the Heading of the Patent, under "Assignee" change

"Agfa-Gevaert Aktiengesellschaft" to -- AGFA-GEVAERT, a naamloze vennootschap --.

Column 10, line 14, change "is" to -- in --.

Signed and Sealed this fourth Day of November 1975

[SEAL]

Attest:

RUTH C. MASON
*Attesting Officer*

C. MARSHALL DANN
*Commissioner of Patents and Trademarks*